June 18, 1935.  J. FLETCHER  2,004,937
PORTABLE ELECTRIC COOKER
Filed March 16, 1934
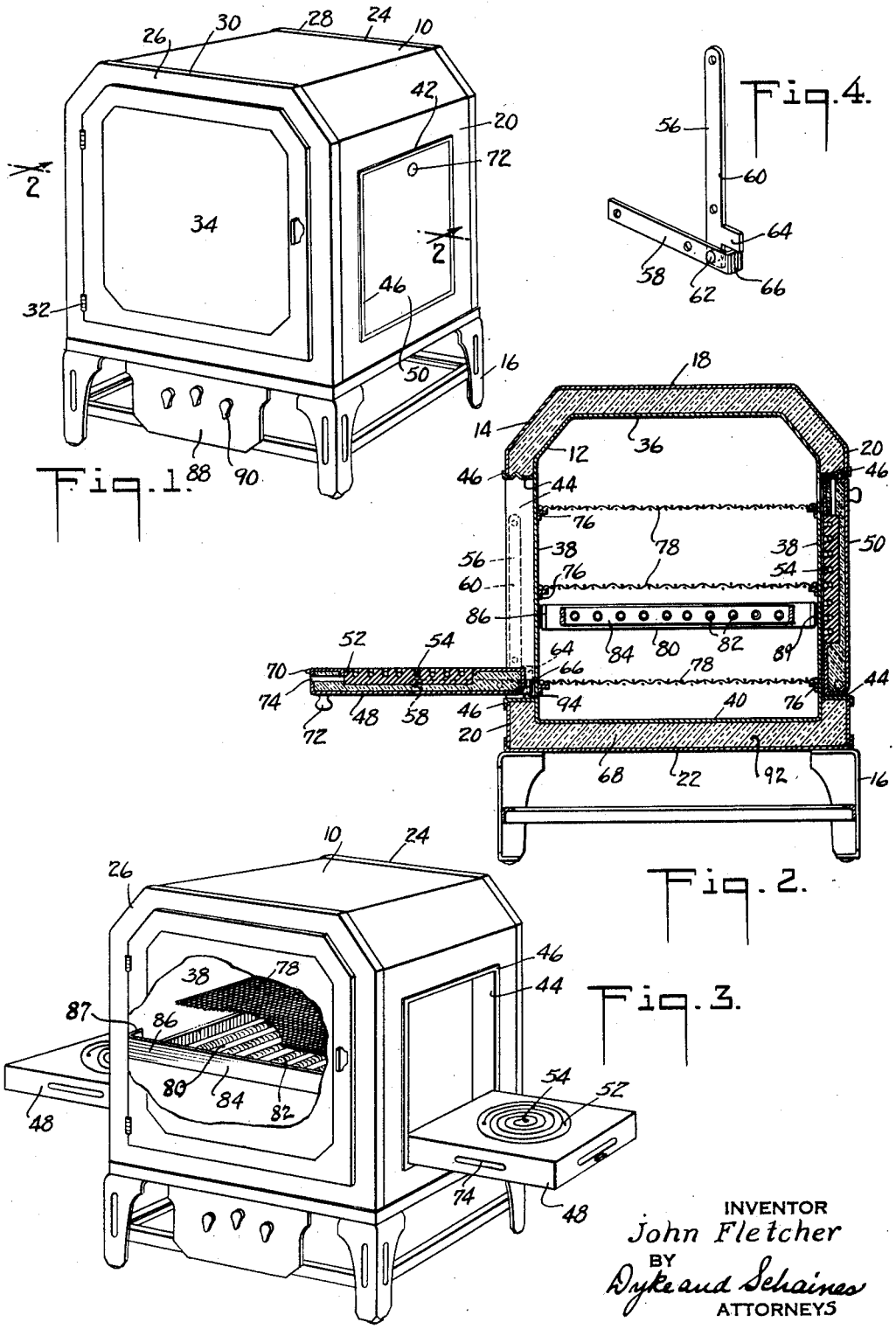
INVENTOR
John Fletcher
BY
Dyke and Schaines
ATTORNEYS

Patented June 18, 1935

2,004,937

UNITED STATES PATENT OFFICE 2,004,937

PORTABLE ELECTRIC COOKER

John Fletcher, New York, N. Y., assignor to Electric Trading Corporation, New York, N. Y., a corporation of New York Application March 16, 1934, Serial No. 715,802

4 Claims. (Cl. 219—35)

My invention relates to electric ranges, and particularly to portable electric ranges, and has for its main object the provision of an electric range which may readily be placed in operation in any location where there is a source of electric current.

Another object of my invention is to provide an "all purpose" cooker, with which nearly every food treating operation may be carried on, either separately, or simultaneously.

A further object of my invention is to provide, in a device of the character described, a plurality of heating elements, adapted to act independently of or in "boosting" relation, to each other.

A further object of my invention is to provide, in a device of the character described, an arrangement whereby of the several heating elements provided, certain thereof may be used for particular foodstuffs heat treating operations, and certain others thereof used simultaneously for other operations.

A further object of the invention is to provide a device of the character described which is simple, compact and sturdy in construction, durable and long-lived in use, with provision for quick and easy replacement of those few parts subject to wearing out upon long use.

Other objects of the invention will in part be obvious from the following description of one embodiment thereof, and in part be pointed out below.

In the drawing annexed hereto and forming a part hereof,

Fig. 1 is a perspective of one form of device constructed according to and embodying my said invention, showing the exteriorly located heating elements disposed against the body of the cabinet;

Fig. 2 is a vertical section thereof on the line 2—2 of Fig. 1;

Fig. 3 is a perspective similar to Fig. 1, except that the exteriorly located heating elements are shown swung outwardly from the body of the cabinet and part of the door is broken away to show the interior of the cabinet; and Fig. 4 is a perspective of one of the hinges by which said exteriorly located elements are supported.

Cabinet 10 is composed of a pair of casing members; inner casing 12 and outer casing 14, and legs 16 are provided, upon which the cabinet is supported. Casings 12 and 14 are spaced apart from each other, providing a clearance therebetween in which there may be disposed a body of suitable insulating material. Outer casing 14 is composed of a single sheet of light gauge metal, which is machine stamped and bent to form top wall 18, and side walls 20, 20. Bottom 22, completing the outer casing, is composed of a rectangular sheet with the edges 23 thereof turned up at right angles thereto and spot welded to the bottom of side walls 20, 20. Plates 24 and 26 are secured respectively to the rear and front of the casings, and flanges 28 and 30 are bent over therefrom respectively and secured, as by spot welding, to casing 10. On plate 26 there is mounted on hinges 32 a closure 34, to complete the cabinet 10, and permit ready access to the interior thereof upon opening of said closure.

Inner casing 12 is similarly composed of a single sheet of light gauge metal, machine stamped and bent to form top wall portion 36, side walls 38, 38 and floor 40, to correspond to, but spaced from, top 18, sides 20, 20, and bottom 22, of the outer casing respectively.

Recess 42 is provided within side 20 of casing 14 by stamping or cutting out therefrom a rectangular portion thereof, and the limits of the recess are defined by metal strips 44 which extend inwardly at right angles to and abut against side walls 38 of casing 12. Edges 46 are bent over from strips 44 and secured to sides 20, 20, of the casing, as by spot welding. A heating element 52 is mounted within each of panels 48, which panels are adapted to be swung into and out of recesses 42 and when so disposed within the recesses the backs or bottoms 50 of panels 48 are flush with sides 20. The side walls 38 of the inner casing member 12, consisting of heat conducting thin sheet metal form the inner walls of recesses 42 and separate same from the interior oven space inside casing member 12.

Heating element 52 is composed of a solid block of some insulating material, such as porcelain, seated and secured within panel 48. A spiral groove is formed in the upper surface of the block and within this groove is deposited a wire coil 54, of standard size and heating capacity. The connections to and from the coil ends are led out through the back of the block inside the panel, out of sight.

Panel 48 is supported in extended position, that is, swung outwardly from recess 40, by means of a hinge 56. This hinge is composed of two flat strips of metal 58 and 60, pivoted together at 62 for movement into right angular (Figs. 2 and 4) or laterally projecting relation to each other. Leaf 60 is provided with an ear 64 extending laterally and outwardly from the body thereof at a point adjacent the connection 62, and end 66 of leaf 58, beyond connection 62, is bent over at right angles to the plane of said leaf, so that ear 64 acts as a stop to prevent movement of leaf 58 to any angle greater than a right angle. Leaf 58 is preferably embedded in the insulating block of the heating element, out of sight, and leaf 60 may similarly be disposed out of sight within space 68 between the inner and outer casings by securing same to the inside of strip 44. All that is necessary is that the bent over end 66 project outwardly from the block and through a guideway slot 94 therefor cut in strip 44, in order to engage and be stopped from further angular movement by ear 64.

This arrangement allows for free movement of the heating element into and out of the recess, and the hinge 56 may be made of such strong metal, as to support quite a heavy load when the elements are in use.

Conventional spring clip means 70 are provided to lock panel 48 within the recess, and additional means (not shown) may be positioned on the back of said panels to provide reinforcing support for the weight thereof when in extended position. Handle knobs 72 are provided on the panels for opening same.

A plurality of vents 74 are provided in elements 52 extending transversely therethrough and through panels 48 to allow for the passage of air through the heating elements.

A number of conveniently arranged supports 76 are provided within the interior of the casing, secured to the inner surfaces of sides 38, adapted to support racks or grids 78 on which may be placed the pots and pans used in connection with the preparation of foodstuffs.

An additional heating element 80 is provided within the interior of the cabinet. This heating element is exposed on both faces thereof, and consists merely of a standard size wire coil 82 threaded back and forth with suitable conventional insulation across a pair of bars 84, mounted in a pair of brackets 86, which brackets are secured to the front and back portions of walls 38 (see Fig. 3) by their bent over ends 87, as by spot welding, at 89.

A control plate 88 is provided, placed preferably at the bottom of front portion 26, on which one or more dials or knobs 90 may be positioned for making and breaking the electrical circuits, and the arrangements may be such that the elements 52 and 80 may be actuated independently of one another, or collectively. The wiring (not shown) is of conventional character, and the connections are disposed out of sight in the space 68 between the inner and outer casing, and the connecting cable (not shown) to the electric outlet passes through an aperture in the bottom of rear wall 20. The wire in each of the heating coils is of standard size, and the device of the present invention may be connected directly to any house or ordinary electric outlet. No special wiring arrangement is needed. The cable connection is merely plugged in to any convenient outlet, the current switched on, and the device put into operation.

The insulating material 92 inserted in space 68 between the casings is of conventional non-inflammable character, preferably of asbestos base, and one such, known as "Rock Wool", is readily obtainable.

The advantages of the device of my invention are obvious. For one thing, the device as a whole is compact and of such relatively light weight as to be readily movable to any desired location.

When not in use, or when the inner chamber alone is in use, the side elements may be folded up out of sight within recesses 42, thus helping to insulate the chamber.

For frying or broiling, element 52 alone may be used; for broiling or roasting, element 80 alone may be used. For baking, the element 80 may be utilized, and in this operation, element 52 also might be brought into play to serve as a "booster". Between recess 42 and the inside of the cabinet, there is but the thin wall 38 of the inner casing. The element 52 bears directly against this wall, and when in operation serves to greatly increase the amount of heat generated within the chamber over that when only element 80 is used. It is obvious that both roasting and broiling operations may be carried on at the one time, in connection with the use of the open element 80, and, as element 52 may be used at the same time, practically every food treating operation may be carried on with my device at one and the same time.

Having thus described one embodiment of my invention, for purposes of illustration but not for limitation, what I claim and desire to secure by Letters Patent is:

1. Apparatus for the electrical heat treatment of food and the like, comprising a casing with an access door and providing an oven chamber which is close when the door is shut, electrical heating means within the oven chamber whereby heat is directly applied to food placed inside the chamber, fixed insulation about the casing with a recessed portion therein exposing a relatively heat conductive part of the oven wall which is away from the access door, and an outside heater usable separately or in conjunction with the oven heater, and comprising electric heating means on an insulation base, and adapted in one position to occupy said recessed portion with the heating means toward the casing wall and the insulation base facing outwardly whereby to complete the casing insulation, and projecting in another position substantially horizontally from the casing beneath the exposed wall portion and with the heating means uppermost.

2. Apparatus as claimed in claim 1, wherein the insulation is enclosed in an exterior jacket, said jacket also providing a lining wall about said recessed portion extending inwardly to the exposed relatively heat conductive wall portion.

3. Apparatus in accordance with claim 1 in which the exterior heater is hingedly attached to the casing near the bottom of the recessed portion, and stop means is provided for holding it in horizontal relationship when turned outwardly.

4. In a cooker, an inner wall forming a cooking chamber, an outer wall surrounding said inner wall and spaced therefrom, an opening in said outer wall, a block of insulating material adapted to be received therein and to abut against the inner wall, a heating element embedded in the inner face of said block, and means pivotally connecting said block to said cooker for movement into and out of said opening comprising a hinge consisting of a pair of flat leaves pivoted together at one end of each thereof, one of which is embedded within the block and the other of which is secured in the space between the inner and outer walls, said first mentioned leaf extending beyond the pivot, said extending end and a portion of said second-mentioned leaf being arranged to abut each other to limit relative angular movement of said leaves.

JOHN FLETCHER.